(12) United States Patent
Luo (10) Patent No.: US 7,574,018 B2
(45) Date of Patent: Aug. 11, 2009

(54) VIRTUAL REALITY SCENE GENERATOR FOR GENERATING TRAINING IMAGES FOR A PATTERN RECOGNITION CLASSIFIER

(75) Inventor: Yun Luo, Livonia, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 670 days.

(21) Appl. No.: 11/299,129

(22) Filed: Dec. 7, 2005

(65) Prior Publication Data

US 2007/0127811 A1 Jun. 7, 2007

(51) Int. Cl.
*G06K 9/00* (2006.01)
(52) U.S. Cl. .................... 382/103; 382/181; 701/28
(58) Field of Classification Search ............. 382/100, 382/103, 104, 106, 107, 181, 190, 195; 701/1, 701/28, 45
See application file for complete search history.

(56) References Cited

U.S. PATENT DOCUMENTS

| | | | | |
|---|---|---|---|---|
| 5,330,226 | A * | 7/1994 | Gentry et al. | 280/735 |
| 5,903,884 | A | 5/1999 | Lyon et al. | |
| 6,529,809 | B1 | 3/2003 | Breed et al. | |
| 6,698,663 | B2 | 3/2004 | Wang et al. | |
| 6,760,693 | B1 | 7/2004 | Singh et al. | |
| 7,006,952 | B1 * | 2/2006 | Matsumoto et al. | 703/2 |
| 7,164,117 | B2 * | 1/2007 | Breed et al. | 250/221 |
| 7,353,151 | B2 * | 4/2008 | Furusu et al. | 703/11 |
| 2003/0016845 | A1 * | 1/2003 | Farmer | 382/103 |
| 2003/0033066 | A1 * | 2/2003 | Farmer | 701/45 |

FOREIGN PATENT DOCUMENTS

| | | |
|---|---|---|
| EP | 1 254 812 B1 | 11/2004 |
| WO | WO 96/04614 A1 | 2/1996 |
| WO | WO 02/04256 A2 | 1/2002 |

OTHER PUBLICATIONS

Kuhl et al., "Training of Classifiers Using Virtual Samples Only", *17th International Conference on Pattern Recognition (ICPR '04)*, vol. 3, pp. 418-421, Downloaded on Dec. 1, 2008 at 09:38 from IEEE Explore.

Gavrila et al., "Virtual Sample Generation For Template-Based Shape Matching", *Computer Vision and Pattern Recognition*, 2001. CVPR 2001. Proceedings of the 2001 IEEE Computer Society Conference on Publication Date: 2001. vol. 1, pp. I-676-I-681, Downloaded on Dec. 1, 2008 at 09:44 from IEEE Explore.

* cited by examiner

*Primary Examiner*—Anand Bhatnagar
(74) *Attorney, Agent, or Firm*—Tarolli, Sundheim, Covell & Tummino LLP (57) ABSTRACT

Systems and methods are provided for generating training samples for a classification system associated with a vehicle occupant protection system. A three-dimensional virtual reality scene is generated (138) from a cockpit model having a set of at least two user configurable parameters (132) and an occupant model having a set of at least two user configurable parameters and a plurality of points of articulation (134). A plurality of training samples are generated from the virtual model (142). Each of the plurality of training samples has a first set of parameters associated with the cockpit model, a second set of parameters associated with the occupant model, and an occupant pose defined according to the points of articulation associated with the occupant model.

21 Claims, 5 Drawing Sheets

VIRTUAL REALITY SCENE GENERATOR FOR GENERATING TRAINING IMAGES FOR A PATTERN RECOGNITION CLASSIFIER

TECHNICAL FIELD

The present invention is directed generally to pattern recognition classifiers and is particularly directed to a method and apparatus for generating training and verification samples for a pattern recognition classifier.

BACKGROUND OF THE INVENTION

Actuatable occupant restraining systems having an inflatable air bag in vehicles are known in the art. Such systems that are controlled in response to whether the seat is occupied, an object on the seat is animate or inanimate, a rearward facing child seat present on the seat, and/or in response to the occupant's position, weight, size, etc., are referred to as smart restraining systems. One example of a smart actuatable restraining system is disclosed in U.S. Pat. No. 5,330,226.

Pattern recognition systems include systems capable of distinguishing between classes of real world stimuli according to a plurality of distinguishing characteristics, or features, associated with the classes. A number of pattern recognition systems are known in the art, including various neural network classifiers, support vector machines, and Bayesian classification models. Training a pattern recognition system requires a large number of samples to obtain acceptable accuracy rates. In some applications, samples will not be available in sufficient number for some or all of the output classes. Even where samples are available in sufficient numbers, collecting and preparing the samples can be a significant expense, especially where the output classes for a particular application change frequently. Further, training a pattern recognition classifier is a time-intensive process that must be repeated with the addition of each new output class.

SUMMARY OF THE INVENTION

In accordance with an example embodiment of the present invention, a method is provided for generating training samples for a classification system associated with a vehicle occupant protection system. A three-dimensional virtual reality scene is generated from a cockpit model having a set of at least two user configurable parameters and an occupant model having a set of at least two user configurable parameters and a plurality of points of articulation. A plurality of training samples is generated from the virtual reality scene. Each of the plurality of training samples has a first set of parameters associated with the cockpit model, a second set of parameters associated with the occupant model, and an occupant pose defined according to the points of articulation associated with the occupant model.

In accordance with another example embodiment of the present invention, a system is provided for generating a plurality of training images. A cockpit model, configurable according to a plurality of parameters, simulates a vehicle interior in a three-dimensional space. An occupant model, configurable according to a plurality of parameters, simulates a vehicle occupant. A virtual reality scene constructor fuses the occupant model and the cockpit model to form a three-dimensional virtual reality scene. An image generator generates an image of the three-dimensional virtual reality scene from a selected camera perspective.

In accordance with yet another example embodiment of the present invention, a computer program product, operative in a data processing system and recorded on a computer readable medium, is provided for determining at least one characteristic of a vehicle occupant. The computer program product includes a component for generating a set of verification samples, having a known class membership, for the pattern recognition classifier. This component comprises a cockpit model, configurable according to a plurality of parameters, that simulates a vehicle interior in a three-dimensional space and an occupant model, configurable according to a plurality of parameters that simulates a vehicle occupant. The component further comprises a sample generator that generates a sample for the classifier from the cockpit model and the occupant model. The computer program product further comprises a pattern recognition classifier operative to classify the set of verification samples, identify a set of at least one verification sample that was not properly classified from the set of verification samples, and incorporate the identified set of at least one verification sample into a set of training data associated with the classifier.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
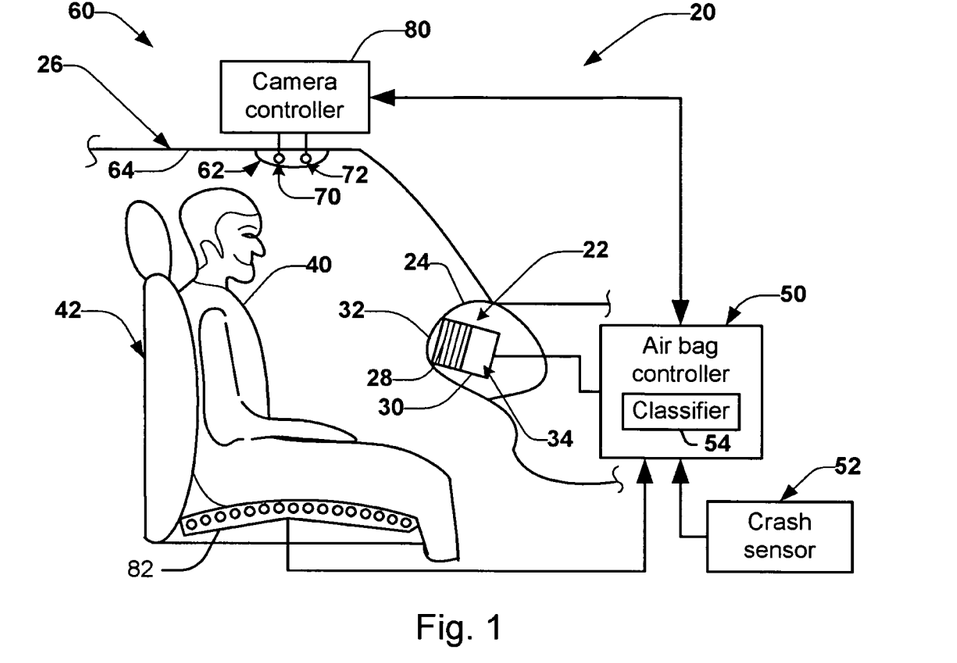
FIG. 1 is a schematic illustration of an actuatable restraining system in accordance with an example embodiment of the present invention.

Referring to FIG. 1, an example embodiment of an actuatable occupant restraint system 20, in accordance with the present invention, includes an air bag assembly 22 mounted in an opening of a dashboard or instrument panel 24 of a vehicle 26. The air bag assembly 22 includes an air bag 28 folded and stored within the interior of an air bag housing 30. A cover 32 covers the stored air bag and is adapted to open easily upon inflation of the air bag 28.

The air bag assembly 22 further includes a gas control portion 34 that is operatively coupled to the air bag 28. The gas control portion 34 may include a plurality of gas sources (not shown) and vent valves (not shown) for, when individually controlled, controlling the air bag inflation, e.g., timing, gas flow, bag profile as a function of time, gas pressure, etc. Once inflated, the air bag 28 may help protect an occupant 40, such as a vehicle passenger, sitting on a vehicle seat 42.

Although the example embodiment of FIG. 1 is described with regard to a vehicle passenger seat, the present invention is applicable to a vehicle driver seat and back seats and their associated actuatable restraining systems. The present invention is also applicable to the control of side actuatable restraining devices and to actuatable devices deployable in response to rollover events.

An air bag controller 50 is operatively connected to the air bag assembly 22 to control the gas control portion 34 and, in turn, inflation of the air bag 28. The air bag controller 50 can take any of several forms such as a microcomputer, discrete circuitry, an application-specific-integrated-circuit ("ASIC"), etc. The controller 50 is further connected to a vehicle crash sensor 52, such as one or more vehicle crash accelerometers. The controller monitors the output signal(s) from the crash sensor 52 and, in accordance with an air bag control algorithm using a deployment control algorithm, determines if a deployment event is occurring, i.e., one for which it may be desirable to deploy the air bag 28. There are several known deployment control algorithms responsive to deployment event signal(s) that may be used as part of the present invention. Once the controller 50 determines that a deployment event is occurring using a selected crash analysis algorithm, for example, and if certain other occupant characteristic conditions are satisfied, the controller 50 controls inflation of the air bag 28 using the gas control portion 34, e.g., timing, gas flow rate, gas pressure, bag profile as a function of time, etc.

The air bag control algorithm associated with the controller 50 can be made sensitive to determined characteristics of the vehicle occupant 40. For example, if the determined characteristics indicate that the occupant 40 is an object, such as a shopping bag, and not a human being, actuating the air bag during a crash event serves no purpose. Accordingly, the air bag controller 50 can include a pattern recognition classifier assembly 54 operative to distinguish between a plurality of occupant classes based on the determined characteristics, and a selected occupant class can then, in turn, be used to control the air bag. It will be appreciated that the classifier 54 can be implemented as an independent module that communicates with air bag controller 50 or, alternatively, be integrated into the air bag controller 50.

Accordingly, the air bag restraining system 20, in accordance with the present invention, further includes an array of weight sensors 82 that indicates the distribution of weight on the vehicle seat 42 or/and a stereo-vision assembly 60. The weight sensors can be distributed across the surface of the seat as to provide a two-dimensional representation of the pressure applied on the seat by the presence of the occupant. The output of each sensor in the array 82 can be provided to the air bag controller 50 and used as inputs to the pattern recognition classifier 54.

The stereo-vision assembly 60 can include stereo-cameras 62 preferably mounted to the headliner 64 of the vehicle 26. The stereo-vision assembly 60 includes a first camera 70 and a second camera 72, both connected to a camera controller 80. In accordance with one exemplary embodiment of the present invention, the cameras 70, 72 are spaced apart by approximately 35 millimeters ("mm"), although other spacing can be used. The cameras 70, 72 are positioned in parallel with the front-to-rear axis of the vehicle, although other orientations are possible.

Figure 2:
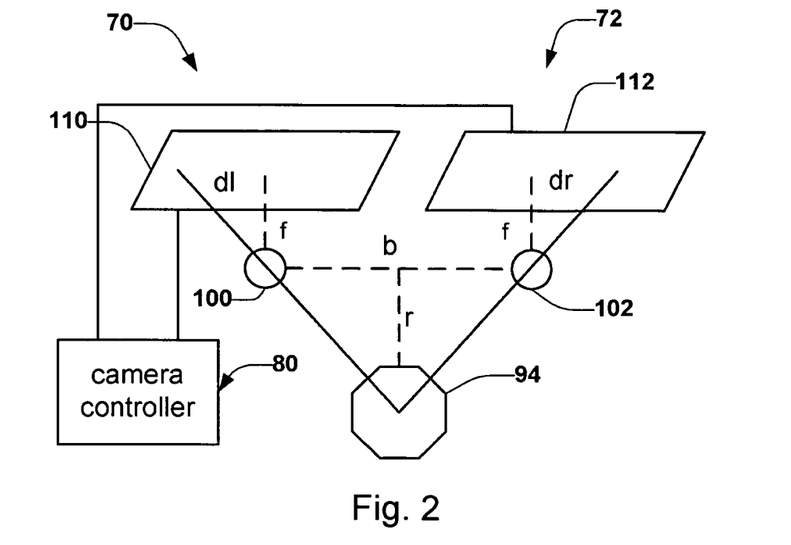
FIG. 2 is a schematic illustration of a stereo camera arrangement for use with the present invention.

The camera controller 80 can take any of several forms such as a microcomputer, discrete circuitry, ASIC, etc. The camera controller 80 is connected to the air bag controller 50 and provides a signal to the air bag controller 50 to provide data relating to various image characteristics of the occupant seating area, which can range from an empty seat, an object on the seat, a human occupant, etc. Herein, image data of the seating area is generally referred to as occupant data, which includes all animate and inanimate objects that might occupy the occupant seating area. It will be appreciated that the classifier 54 can utilize other inputs besides the array of weight sensors 82 and the camera controller 80. FIG. 2 is a schematic illustration of the cameras 70 and 72 of the stereo-vision assembly 60. The cameras 70 and 72 may be of any several known types. For example, the cameras may be charge-coupled devices ("CCD") or complementary metal-oxide semiconductor ("CMOS") devices. Preferably, the cameras 70 and 72 take two-dimensional, grayscale images of the passenger compartment of the vehicle 26. In one example embodiment of the present invention, the cameras 70 and 72 are wide spectrum response cameras that cover the visible and near-infrared spectrums.

The cameras 70 and 72 are spaced apart from one another so as to enable the cameras to be used for determining a distance, also called a "range," from the cameras to an object. The object is shown schematically in FIG. 2 and is indicated by reference numeral 94. The distance between the cameras 70 and 72 and the object 94 may be determined by using triangulation. The cameras 70 and 72 have different views of the passenger compartment due to the position of the object 94 relative to each camera 70 and 72 being different. As a result, the object 94 is located at a different position in the image obtained by camera 70 than in the image obtained by camera 72. The difference in the positions of the object 94 in the images is referred to as "disparity." To get a proper disparity between the images for performing triangulation, it is desirable for the cameras 70 and 72 to be positioned so that the object 94 to be monitored is within the horopter of the cameras.

Camera 70 includes a lens 100 and a pixel array 110. Likewise, camera 72 includes a lens 102 and a pixel array 112. Since the cameras 70 and 72 are located at different positions relative to the object 94, an image of the object 94 formed on the pixel array 110 of camera 70 differs from an image of the object 94 formed on the pixel array 112 of camera 72. The distance between the viewpoints of the cameras 70 and 72, i.e., the distance between the lenses 100 and 102, is designated "b" in FIG. 2. The focal length of the lenses 100 and 102 of the cameras 70 and 72 is designated as "f" in FIG. 2. The lenses 100 and 102 of the cameras 70 and 72 of FIG. 2 have the same focal lengths. The horizontal distance from the image center on the pixel array 110 and the image of the object 94 on the pixel array 110 of camera 70 is designated "dl" in FIG. 2. The horizontal distance from the image center on the pixel array 112 and the image of the object 94 on the pixel array 112 for the camera 72 is designated "dr" in FIG. 2. Preferably, the cameras 70 and 72 are mounted so that they are in the same image plane. The difference between dl and dr is referred to as the "image disparity" and is directly related to the distance, designated "r" in FIG. 2, to the object 94 where the distance r is measured normal to the image plane of cameras 70 and 72 from a location v on the image plane. It will be appreciated that $$r=bf/d, \text{ where } d=dl-dr. \quad \text{(Equation 1)}$$

From equation 1, the distance r to the object 94 as a function of disparity of the images from cameras 70 and 72 can be determined. It should be appreciated that the distance r is an inverse function of disparity.

Figure 3:
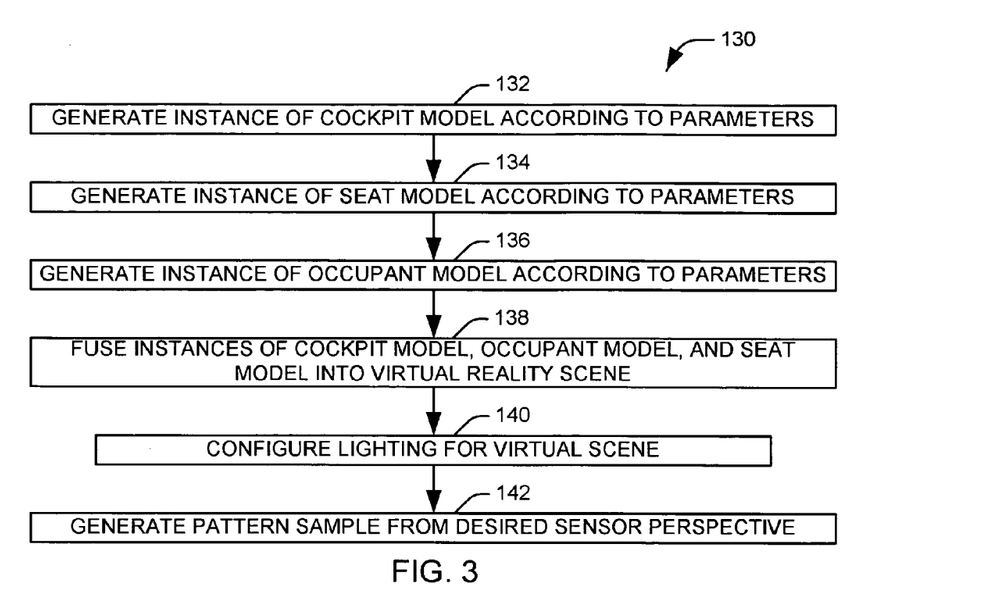
FIG. 3 illustrates a methodology for generating virtual training samples for a pattern recognition classifier for a vehicle occupant protection system in accordance with one example embodiment of the present invention.

FIG. 3 illustrates a methodology 130 for generating virtual training and verification samples for a pattern recognition classifier for a vehicle occupant protection system in accordance with an example embodiment of the present invention.

While, for purposes of simplicity of explanation, the methodology 130 has steps shown and described as executing serially, it is to be understood and appreciated that the present invention is not limited by the illustrated order, as some steps could occur in different orders and/or concurrently with other steps from that shown and described herein.

The methodology 130 begins step 132 where an instance of a cockpit model is generated according to a plurality of parameters. The parameters can be generated randomly from a series of predefined distributions or provided by a user. The parameters associated with the cockpit model can define, for example, the dimensions, configuration, and the perceived color and texture of one or more surfaces within the cockpit. It will be appreciated that the cockpit model can be made specific to a given model of vehicle 26 associated with the vehicle occupant protection system 20.

At step 134, an instance of a seat model is generated according to a plurality of parameters. As with the cockpit parameters, the seat parameters can be generated randomly from a series of predefined distributions or provided by a user. The parameters associated with the seat model can define, for example, the horizontal location, seat back angle, vertical position of rear and front edges of the seat, headrest position, and the perceived color and texture of the seat surface. It will be appreciated that the seat model can also be specific to a given model of vehicle, and that the range of available parameters and any probability distributions of parameters associated with parameters can be dependant on the selected cockpit parameters.

At step 136, an instance of an occupant model is configured according to a plurality of parameters. The occupant parameters can be generated randomly from a series of predefined distributions or provided by a user. It will be appreciated that the occupant image generated by occupant model will not necessary represent a human occupant, and that images of infant and child seats, other objects (e.g., shopping bags, suitcases, etc.), and even a null occupant representing an empty seat can be provided as an instance of the occupant model. Where multiple occupant types are represented, an appropriate occupant type can be selected as part of the configuration process. Parameters associated with the occupant model can define, for the example of a human occupant, the occupant's height, weight, pose, skin color, light absorption, and light reflection properties, and apparel. It will be appreciated that similar sets of parameters can be provided for other occupant types (e.g., infant and child seats). The range of available parameters and any probability distributions of parameters associated with parameters can be dependant on the selected seat parameters and cockpit parameters.

At step 138, the instances of the cockpit model, the seat model, and the occupant model are combined to produce a three-dimensional virtual reality image. The three-dimensional images represented by the various instances of the models are integrated in a logical manner to create a representation of an occupant seated in a vehicle interior. For example, surfaces within the cockpit instance or seat instance that would not be visible due to the presence of an occupant can be replaced by new surfaces defined by the occupant instance. The final virtual reality image provides a three-dimensional view of the cockpit that can be imaged from any of a plurality of angles to provide a realistic two-dimensional virtual image of the interior. In addition, since the virtual reality image is rendered in three dimensions, depth values can be taken directly from the image. Accordingly, the system can be used to train systems that track the position (e.g., distance from vehicle front) of objects and occupants within the vehicle.

At step 140, lighting characteristics are configured for the training image, if necessary. It will be appreciated that for some applications (e.g., training an array of weight sensors), determining the lighting characteristics of the scene will not be necessary. The lighting can be defined by a plurality of parameters representing the source (e.g., sunlight or artificial light), the direction, and the intensity of the light source. The occupant parameters can be generated randomly from a series of predefined distributions or provided by a user. It will be appreciated that the acceptable ranges and probability distributions will depend, in part, on the location of artificial lighting within the vehicle 26.

At 142, at least one training or verification sample is generated from the virtual reality scene according to at least one sensor perspective. The sensor location associated with a given perspective can be determined to represent one of a plurality of available sensors in the vehicle 26. In generating the training or verification sample, the virtual scene, comprising the cockpit model, the seat model, and the occupant model, is utilized to emulate the input of a sensor according to its location, one or more characteristics of the occupant, cockpit, or seat, and one or more characteristics of the sensor. Multiple sensor readings can be made of a given scene, where desirable. The generated samples can be added to a plurality of training samples or a set of verification samples for the classifier.

The disclosed environment can be used to simulate, train and test for a variety of sensor systems. For example, the virtual cockpit can be utilized, along with a camera and lighting model, to generate training images for a camera based system. Alternatively, the cockpit, seat, and occupant models can be combined to simulate the weight distribution of the occupant mass under all different vehicle dynamics and occupant motions as part of a weight based pattern recognition system.

Figure 4:
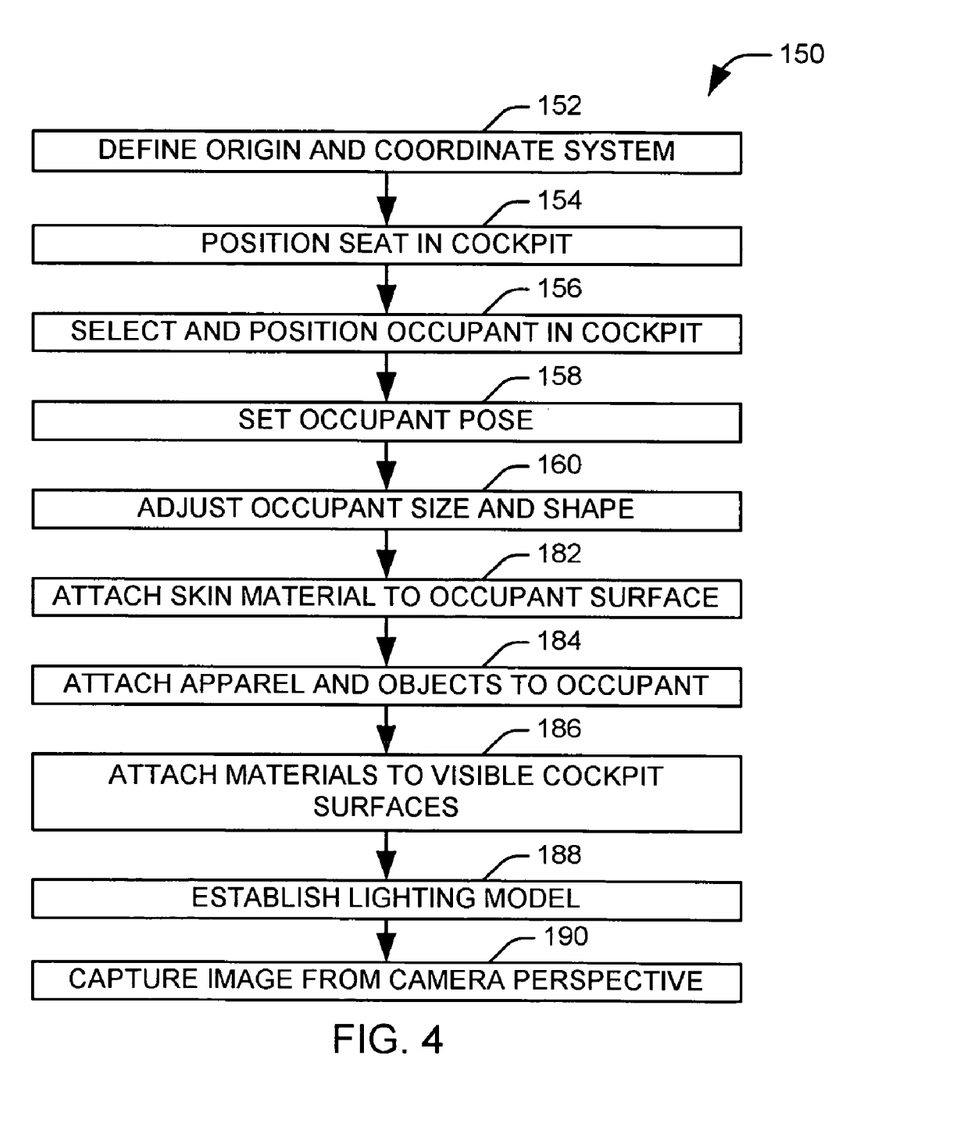
FIG. 4 illustrates one example methodology of the present invention for generating virtual training samples for a pattern recognition classifier for a vehicle occupant protection system.

FIG. 4 illustrates an example methodology 150 for generating virtual training samples for a pattern recognition classifier for a vehicle occupant protection system in accordance with the present invention. The methodology 150 begins at step 152, where an origin and coordinate system are established within the cockpit model. The established origin and coordinates serve as a global coordinate system, providing a reference for any local coordinate systems utilized within the methodology, such as local coordinate systems used to determine the position of the occupant and the seat.

At step 154, a seat is positioned and posed within the cockpit. In an example implementation, the position and pose of the seat can vary along several ranges of motion. For example, the seat position can vary along a longitudinal axis of the vehicle, and the angle of recline of the seat back can vary along predetermined range. In addition, the vertical positions of each of the front and rear edges of the seat can be adjusted along with the position of the headset along the angle defined by the seat back recline. Parameters defining the position of the seat along each range of motion can be selected by a user, assigned according to a predetermined list for each parameter, or selected randomly from associated probability distributions. Where the parameter is selected randomly, it will be appreciated that the likelihood of the various values of the parameter can depend on the model of the vehicle.

At step 156, one of a plurality of occupant models can be selected, and the occupant model can be positioned in the cockpit. In accordance with an example implementation, the occupant models can include adult humans of various sizes, including adults in the $95^{th}$, $50^{th}$, and $5^{th}$ percentiles in height and weight, children of various ages (e.g., 3 and 6 years old), a booster seat, a rearward facing infant seat, a frontward facing child seat, and various other objects that may be resting on the seat, such as a purse, bag, or laundry box. Once the occupant model has been selected, the position of the occupant on the seat can be selected as a set of one or more parameters. It will be appreciated that the available positions on the seat will vary with the type and size of the selected occupant model.

At step 158, the pose of the occupant can be selected. Depending on the selected occupant model, the complexity of the occupant pose can vary. For example, in the case of a shopping bag, the occupant pose can be as simple selecting one of a limited number of angles available to the bag given its position on the seat and the position of the seat back. In the case of a human occupant, however, the determination of the pose can be quite complex. The human body can move in a number of different ways, and ideally, a model of a human occupant will contain each major point of articulation associated with a real human body. For each point of articulation, an allowable range can be defined, and the pose of the occupant along that range can be selected by a user, selected according to other, previously generated parameters, or randomly generated accordingly to an associated probability distribution. It will be appreciated that the allowable range and/or the probability distributions of the various pose parameters can depend upon one another as well as the position of the seat, and the dimensions of the vehicle.

The number of possible poses is limited to a small extent by the position of the occupant within an enclosed vehicle cockpit, but in generally, the model can account for arm and hand movement of an occupant along any of a plurality of common poses, including torsion or inclination of the head and neck, movement or leaning of the torso in three dimensions (e.g., inboard, outboard, forward, backward, and slouching down), torsion of the torso, leg movement of the occupant, and poses associated with holding objects, such as newspapers, books, maps, shopping bags, and other common objects. It will be appreciated that a number of other poses can be incorporated into the model to create a full or nearly full representation of all available movement within the confines of the cockpit.

At step 160, the occupant's size and shape can be adjusted. It will be appreciated that the nature and degree of the size and shape change will vary with the type of occupant model, with the human occupant models allowing for the greatest degree of change. For example, the occupant model can be altered to represent occupants of greater or lesser height and weight than the original occupant model. Accordingly, the occupant models can represent not just the body shapes presented by the models, but also body shapes falling between the available models.

Skin material is attached to the occupant surface at step 182. In the illustrated example, a plurality of different skin surfaces are available for a given occupant model, each having an associated color, as well as different absorption and reflectively properties in various wavelength bands of interest. It will be appreciated that the word "skin" here is used broadly to cover the surfaces of human and nonhuman occupants. The number and variation of the skin materials will vary with the occupant type.

At step 184, apparel and other accessory objects can be added to an occupant. In the example of a human occupant, clothing, hats, newspapers, snow coats, and other objects can be added to the occupant model. Non-human occupant models can include different accessories. For example, a blanket can be added to cover a portion of an occupant model representing a child seat. A plurality of objects can be made available for each occupant model, each having associated absorption and reflectivity properties at various wavelengths of interest, and associated surface colors.

At step 186, materials are attached to the visible surfaces within the cockpit. In accordance with an example embodiment of the present invention, the attachment of materials to the cockpit surfaces can be limited to surfaces within the view of one or more cameras associated with the vehicle. It will be appreciated that the surfaces available for application to the cockpit surfaces can be limited by the nature of the visible surfaces and the model of the vehicle. Each surface will have an associated color, as well as different absorption and reflectively properties in various wavelength bands of interest.

At step 188, a lighting model is established as a group of one or more light sources. Each light source can be defined by a plurality of parameters representing the source (e.g., sunlight or artificial light), the direction, and the intensity of the light source. The intensity and direction the light source can be generated randomly from a series of predefined distributions or provided by a user. It will be appreciated that the acceptable ranges and probability distributions will depend, in part, on the location of artificial lighting within the vehicle.

At step 190, an image is captured of the virtual scene, comprising the cockpit model, seat model, and occupant model, in light of a known camera perspective and the established lighting model. The virtual scene is clipped according to the camera's perspective, and only the visible surfaces of the virtual scene are kept. The final value for each pixel is calculated as a function of the 3-D geometry of the scene, the normal color or brightness of the scene, the selected surface material, the lighting, and any known properties of the camera lens. In accordance with an example embodiment of the present invention, multiple images can be made of a given scene, including a color image, a grayscale image, and a set of images utilized for generating a stereo disparity map. The generated image can depend on extrinsic camera parameters, such as the position and orientation of the camera as well as intrinsic camera parameters, such as the lens field of view, distortion, noise within the imager, and similar properties. The generated images can be added to a plurality of training samples for the classifier.

Figure 5:
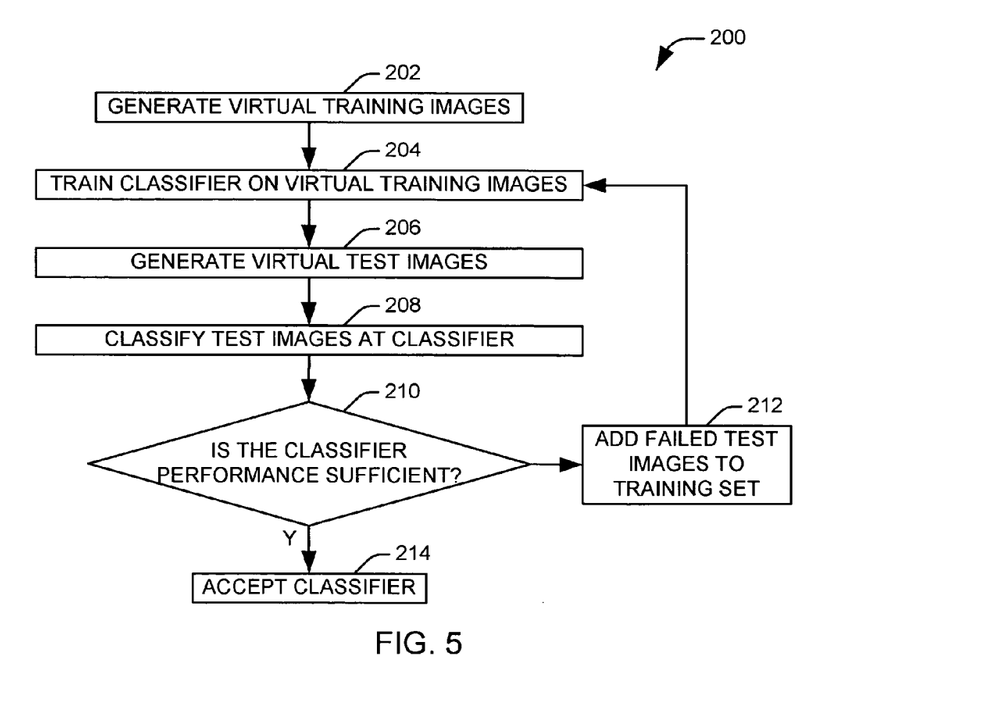
FIG. 5 illustrates a methodology for closed loop training of a pattern recognition classifier in accordance with an example embodiment of the present invention.

FIG. 5 illustrates a methodology 200 for closed loop training of a pattern recognition classifier in accordance with an example embodiment of the present invention. At step 202, a plurality of virtual training images, having known output classes, are generated. Features of interest can be extracted from each image as numerical values to create a feature vector associated with each image. At step 204, a pattern recognition classifier is trained on the images to allow it to discriminate among a plurality of output classes represented by the image. From the training data, the pattern recognition classifier can calculate one or more parameters that can be used to sort unknown samples into one of the plurality of training samples.

For example, a pattern recognition classifier implemented as a support vector machine can process data extracted from associated training images to produce functions representing boundaries in a feature space defined by the various features of interest. The bounded region for each class defines a range of feature values associated with each of the plurality of classes. The location of the feature vector representing the input image with respect to these boundaries can be used to determine the class membership of the input image and the associated confidence value.

Alternatively, a pattern recognition classifier implemented as an artificial neural network comprises a plurality of nodes having a plurality of interconnections. Each of the plurality of interconnections has an associated weight that can be applied to numerical data passed from node to node along the interconnection. The feature vectors associated with the training images are provided to the system along with their associated class to adjust the weights associated with the interconnects to appropriate values for distinguishing among the plurality of output classes.

At step 206, a plurality of virtual verification images, having known output classes, are generated. At step 208, the plurality of virtual verification images are classified at the classifier. The results are analyzed at step 210 to determine if the performance of the classifier is sufficient. At this step, the verification images rejected or misclassified by the classifier can be saved to memory and the overall accuracy and rejected rate of the system can be determined. In accordance with one example implementation, a fitness metric for the classifier can be determined as a function of one or both of the accuracy and the rejection rate associated with the classifier. The fitness metric can be compared to a threshold value to determine if the performance of the classifier meets a desired standard.

If the classifier performance is not sufficient (N), the methodology 200 advances to step 212, where the rejected and misclassified images are incorporated into the training set. The methodology then returns to step 204, where the classifier is retrained on the revised training set and another set of verification images is generated to test the classifier performance. If the performance of the classifier is sufficient (Y), the classifier is accepted at step 214, and the methodology terminates.

Figure 6:
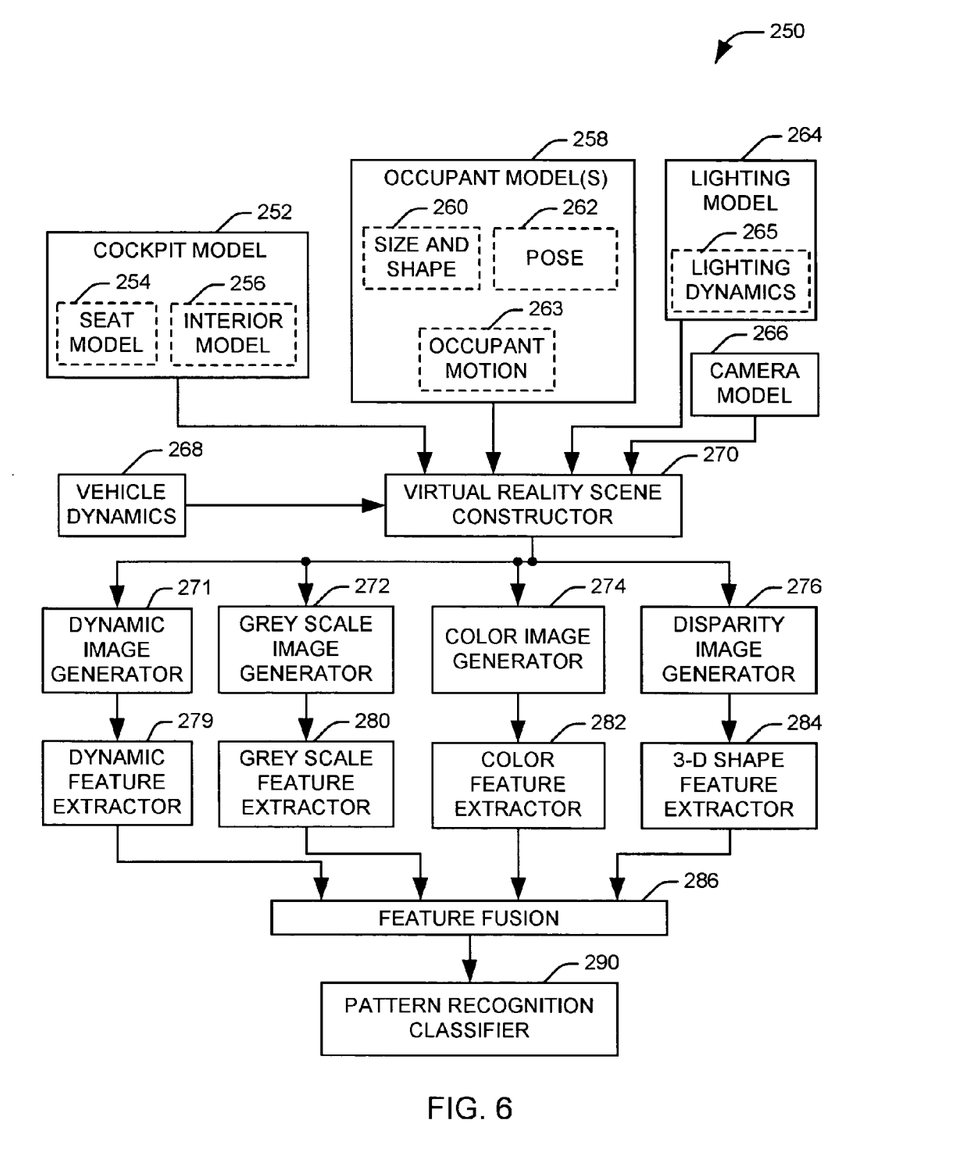
FIG. 6 illustrates a functional block diagram of a virtual reality image generation system in accordance with an example embodiment of the present invention.

FIG. 6 illustrates a functional block diagram of a virtual reality image generation system 250 in accordance with an example embodiment of the present invention. The generation of the virtual images begins with the assignment of one or more parameters to the cockpit model 252, comprising a seat model 254 and an interior model 256. A plurality of parameters can be selected for the cockpit model as to create an instance of the cockpit model having a set of characteristics associated with the parameters. The parameters can define, for example, the dimensions of the cockpit, the configuration of the cockpit, the position and orientation of the seat, and the perceived color and texture of one or more surfaces associated with the cockpit and the seat.

A second component of the virtual scene is provided by one or more occupant models 258, each representing a different occupant type. The occupant models can include adult humans of various sizes, children of various ages, child seats, and other common objects that may be resting on the seat. A plurality of parameters are assigned to a selected occupant model 258 to generate an instance of the occupant model 258. The plurality of parameters includes one or more parameters related to a size and shape model 260 and one or more parameters related to a pose model 262. Parameters associated with the occupant model can define, for the example of a human occupant, the occupant's height, weight, pose, skin color, light absorption and light reflection properties, and apparel. It will be appreciated that similar sets of parameters can be provided for other occupant types.

In one embodiment, the occupant movement 263 can be modeled to allow a series of dynamic training images to be produced. For example, the occupant movement model 263 can include a plurality of common occupant movements (e.g., arm movements, torso movements) that can be simulated as a series of images in time or as video samples. These series of images can be utilized to determine dynamic features for classification or allow for the analysis of a continuous sequence of images for head tracking of a human occupant. In addition, the video images can be used to simulate various events (e.g., crash or pre-crash events, driving conditions, etc.).

A third component of the virtual image comprises a lighting model 264. An instance of the lighting model 264 can be defined by a plurality of parameters representing one or more light sources, the direction of the light sources, and the intensity of the light sources. In one implementation, the lighting model 264 can comprise a dynamic lighting model 265 that simulates changes in lighting over a period of time. This allows for heightened accuracy in generating series of images and video samples for an associated classifier. Finally, a camera perspective can be selected as instance of a camera model 266. The camera model 266 provides both a camera angle and a field of view for generating an image of the vehicle interior. It will be appreciated that the available fields of view and camera angles associated with the camera model 266 can be based upon the location of one or more cameras within the vehicle interior.

The virtual reality image generation system 250 can also include a dynamic vehicle model 267 that simulates changes to the perceived vehicle interior over time. For example, items in the background can shift to simulate abrupt motion of the vehicle, as might be caused by a pre-crash condition or an abrupt turn. The generated instances of the cockpit model 252, the occupant model 258, the lighting model 264, the camera model 266, and the dynamic vehicle model 267 are provided to a virtual reality scene constructor 270. The virtual reality scene constructor 270 fuses the three-dimensional images represented by the various instances of the models in a logical manner to create a representation of an occupant seated in a vehicle interior. For example, surfaces within the cockpit instance or seat instance that would not be visible due to the presence of an occupant are replaced by new surfaces defined by the occupant instance. A final value for each pixel is calculated as a function of the 3-D geometry of the scene, the normal color or brightness of the scene, the selected surface material, the lighting, and any known properties of the camera lens. The final virtual reality image provides a three-dimensional view of the cockpit that can be imaged from any of a plurality of angles to provide a realistic two dimensional image of the virtual interior.

A plurality of images and image series of the vehicle interior can be generated from the selected camera perspective at respective image generators 271, 272, 274, and 276. The image generators can include a dynamic image generator 271, that produces a sequence of images as a video sample, a grayscale image generator 272, a color image generator 274, and a stereo disparity image generator 276. At each image generator 271, 272, 274, and 276, the virtual scene is clipped according to the camera's perspective, and only the visible surfaces of the virtual scene are retained. The generated images are provided to respective feature extractors 279, 280, 282, and 284. Each of the feature extractors 279, 280, 282, and 284 extracts a plurality of numerical feature values from their associated image or image sequence as a feature vector according to a plurality of quantifiable characteristics. It will be appreciated that the characteristics associated with each feature extractor can be different to take advantage of unique characteristics of its associated image or image series. Example characteristics can include a displacement of an identified point during the image series, an average brightness value for the image or one or more portions of the image, one or more average chromaticity values for the image or one or more portions of the image, and one or more average depth values for the image or one or more portions of the image.

The feature vectors generated at the plurality of feature extractors 279, 280, 282, and 284 are combined into a composite feature vector at a feature fusion component 286. The composite feature vector can comprise one or more feature values from each the generated feature vectors as well as one or more feature values determined as a function of a set of one or more feature values from the generated feature vectors. The composite feature vector can then be provided to a pattern recognition classifier 290 as a training sample or a verification sample. The pattern recognition classifier 290 is operative to identify at least one characteristic of the occupant. For example, the classifier 290 can determine an associated type of the occupant (e.g., adult, child, child seat, etc.). Alternatively, the classifier 290 can be used to distinguish among a plurality of head candidates as part of a head tracking system.

In accordance with an example embodiment of the present invention, the pattern recognition classifier 290 can be trained on a plurality of training samples provided by the feature fusion component 286 and used to classify a provided set of verification samples, having known class membership. It will be appreciated that the classifier 290 may misclassify or reject one or more of the training samples. The performance of the classifier 290 can be measured from the prevalence of these misclassified and rejected samples, and the classifier can be trained on the misclassified and rejected samples where the classifier performance does not meet a desired standard. This can be continued iteratively, with the feature fusion component 286 providing new sets of verification samples to the classifier 290, until the classifier reaches a desired standard of performance.

Figure 7:
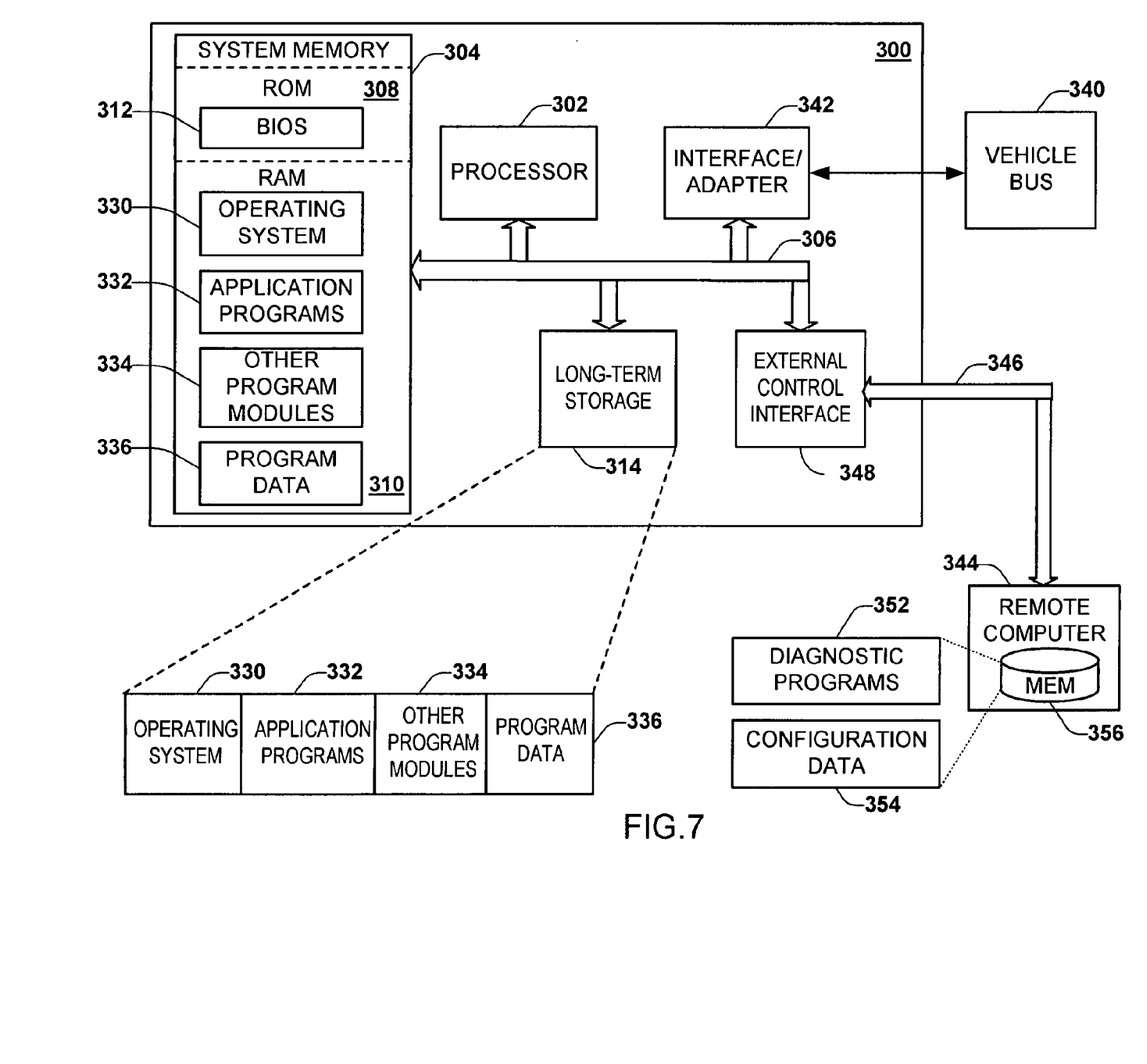
FIG. 7 illustrates a computer system that can be employed to implement systems and methods described herein.

FIG. 7 illustrates a data processing system 300 that can be incorporated into a vehicle to implement systems and methods described herein, such as based on computer executable instructions running on the data processing system. The data processing system 300 can be implemented as one or more general purpose networked computer systems, embedded computer systems, routers, switches, server devices, client devices, various intermediate devices/nodes and/or stand alone computer systems. Additionally, the data processing system 300 can be implemented as part of the computer-aided engineering (CAE) tool running computer executable instructions to perform a method as described herein.

The data processing system 300 includes a processor 302 and a system memory 304. A system bus 306 couples various system components, including a coupling of the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include long term storage 314, for example, a magnetic hard disk, an optical drive, magnetic cassettes, or one or more flash memory cards. The long term storage 314 can contain computer executable instructions for implementing systems and methods described herein. A number of program modules may also be stored in the long term storage as well as in the RAM 310, including an operating system 330, one or more application programs 332, other program modules 334, and program data 336.

The data processing system 300 can be connected to a vehicle bus 340 via an interface or adapter 342 to communicate with one or more vehicle systems. Additionally, the data processing system 300 can be connected to a remote computer 344 via a logical connection 346 for configuration or for diagnostic purposes through an external control interface 348. The remote computer 344 may be a workstation, a computer system, a router, a peer device or other common network node, and typically includes many or all of the elements described relative to the computer system 300. Diagnostic programs 352 and configuration data 354 may be stored in memory 356 of the remote computer 344.

From the above description of the invention, those skilled in the art will perceive improvements, changes, and modifications. Such improvements, changes, and modifications within the skill of the art are intended to be covered by the appended claims.

Having described the invention, the following is claimed:

1. A computer readable medium, encoded with executable instructions configured to be executed by a computer processor to perform a method for generating training samples for a classification system associated with a vehicle occupant protection system, the method comprising the following steps:

generating a three-dimensional virtual reality scene from a cockpit model having a set of at least two user configurable parameters, and an occupant model having a set of at least two user configurable parameters and a plurality of points of articulation; and generating a plurality of samples from the virtual reality scene, each of the plurality of training samples having a first set of parameters associated with the cockpit model, a second set of parameters associated with the occupant model, and an occupant pose defined according to the points of articulation associated with the occupant model.

2. The computer readable medium of claim 1, the method further comprising the step of generating a plurality of verification samples from the virtual scene, each of the plurality of verification samples having a first set of parameters associated with the cockpit model, a second set of parameters associated with the occupant model, and an occupant pose defined according to the points of articulation associated with the occupant model.

3. The computer readable medium of claim 2, the method further comprising the steps of:

training a pattern recognition classifier on the plurality of training samples;

classifying the plurality of verification samples at the pattern recognition classifier; and determining a fitness metric for the pattern recognition classifier as a function of at least one of an accuracy and a rejection rate associated with the classifier according to known class memberships of the plurality of verification samples.

4. The computer readable medium of claim 3, the method further comprising the steps of:

identifying a set of at least one of the plurality of verification samples that was not correctly classified by the pattern recognition classifier; and training the pattern recognition classifier on the identified set of verification samples if the fitness metric for the pattern recognition classifier does not meet a threshold value.

5. The computer readable medium of claim 3, the method further comprising the steps of:

taking a sensor reading of the vehicle interior at a sensor located within the vehicle;

classifying the sensor reading at the pattern recognition classifier into a selected one of a plurality of output classes; and controlling the vehicle occupant protection system according to the selected output class.

6. The computer readable medium of claim 1, wherein the step of generating a three-dimensional virtual reality vehicle scene comprises the steps of:

assigning values for the set of at least two parameters associated with the cockpit model as to generate an instance of the cockpit model having at least one desired characteristic;

assigning values for the set of at least two parameters associated with the occupant model as to generate an instance of the occupant model having at least one desirable characteristic; and fusing the generated instance of the cockpit model and the generated instance of the occupant model to create the three-dimensional virtual reality scene.

7. The computer readable medium of claim 1, wherein the step of generating a plurality of training samples from the virtual scene includes generating a color image, a grayscale image, and a stereo disparity image from at least one camera perspective.

8. The computer readable medium of claim 7, further comprising the steps of:

extracting a first set of numerical features from the color image;

extracting a second set of numerical features from the grayscale image;

extracting a third set of numerical features from the stereo disparity image; and constructing a composite feature vector for training a pattern recognition classifier from the first set of numerical features, the second set of numerical features, and the third set of numerical features.

9. The computer readable medium of claim 1, wherein the step of generating a plurality of training samples comprises at least one step from a step of generating a sequence of images in time and a step of simulating an output from an array of weight sensors.

10. A system for generating a plurality of samples, wherein the samples can be utilized as training and verification samples for a pattern recognition classifier, comprising:

a memory storing:
a cockpit model, configurable according to a plurality of parameters, that simulates a vehicle interior in a three-dimensional space
an occupant model, configurable according to a plurality of parameters, that simulates a vehicle occupant;
a virtual reality scene constructor that fuses the occupant model and the cockpit model to form a three-dimensional virtual reality scene; and
an image generator that generates an image of the three-dimensional virtual reality scene from a selected camera perspective; and a processor, operatively connected to the memory such that the processor can access data stored on the memory, the processor being configured to access each of the cockpit model, the occupant model, the virtual reality scene constructor, and the image generator as to generate the plurality of samples.

11. The system of claim 10, wherein the cockpit model includes a seat model that simulates a vehicle seat according to a plurality of parameters, at least one of the plurality of parameters associated with the seat model defining the position of the seat within the cockpit.

12. The system of claim 11, wherein the plurality of parameters associated with the seat model includes at least one parameter defining the orientation of the seat along at least one range of motion.

13. The system of claim 10, wherein the plurality of parameters associated with the occupant model includes at least one parameter that defines a pose of the occupant along at least one point of articulation.

14. The system of claim 10, wherein the image generator is operative to generate a plurality of images of the virtual scene, where the associated camera perspectives of the plurality of images are selected such that a stereo disparity map can be generated from the plurality of images.

15. The system of claim 10, wherein the system comprises a plurality of occupant models, each representing an associated occupant type, and one of the plurality of occupant models is selected for use in the virtual reality scene.

16. The system of claim 15, wherein the selected occupant model represents an adult human, and at least one of the plurality of parameters associated with the occupant model define a height and weight of the occupant.

17. The system of claim 10, wherein the plurality of parameters associated with the occupant model includes at least one parameter that defines at least one chromatic property of the surface of the occupant.

18. A computer program product, encoded on a computer readable medium and operative in a data processing system, for determining at least one characteristic of a vehicle occupant, comprising:

a component for generating a set of verification samples, having a known class membership, for the pattern recognition classifier, comprising:
a cockpit model, configurable according to a plurality of parameters, that simulates a vehicle interior in a three-dimensional space;
an occupant model, configurable according to a plurality of parameters, that simulates a vehicle occupant; and
a sample generator that generates a sample for the classifier from the cockpit model and the occupant model; and a pattern recognition classifier operative to classify the set of verification samples, identify a set of at least one verification sample that was not properly classified from the set of verification samples, and incorporate the identified set of at least one verification sample into a set of training data associated with the classifier.

19. The computer program product of claim 18, wherein the component for generating a set of verification samples is operative to generate a new set of verification samples for the pattern recognition classifier when a fitness parameter associated with the pattern recognition classifier does not meet a threshold value.

20. The computer program product of claim 18, wherein the plurality of parameters associated with the occupant model includes at least one parameter that defines the pose of the occupant along at least one point of articulation.

21. The computer program product of claim 18, wherein the component for generating a set of verification samples comprises a virtual reality scene constructor that fuses the occupant model and the cockpit model to form a three-dimensional virtual reality scene, the image generator being operative to generate at least one two-dimensional representation of the three-dimensional virtual reality scene according to an associated camera perspective.

* * * * *

UNITED STATES PATENT AND TRADEMARK OFFICE
CERTIFICATE OF CORRECTION

PATENT NO.      : 7,574,018 B2  
APPLICATION NO. : 11/299129  
DATED           : August 11, 2009  
INVENTOR(S)     : Yun Luo Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 912 days.

Signed and Sealed this

Seventh Day of September, 2010

David J. Kappos  
*Director of the United States Patent and Trademark Office*